United States Patent Office.

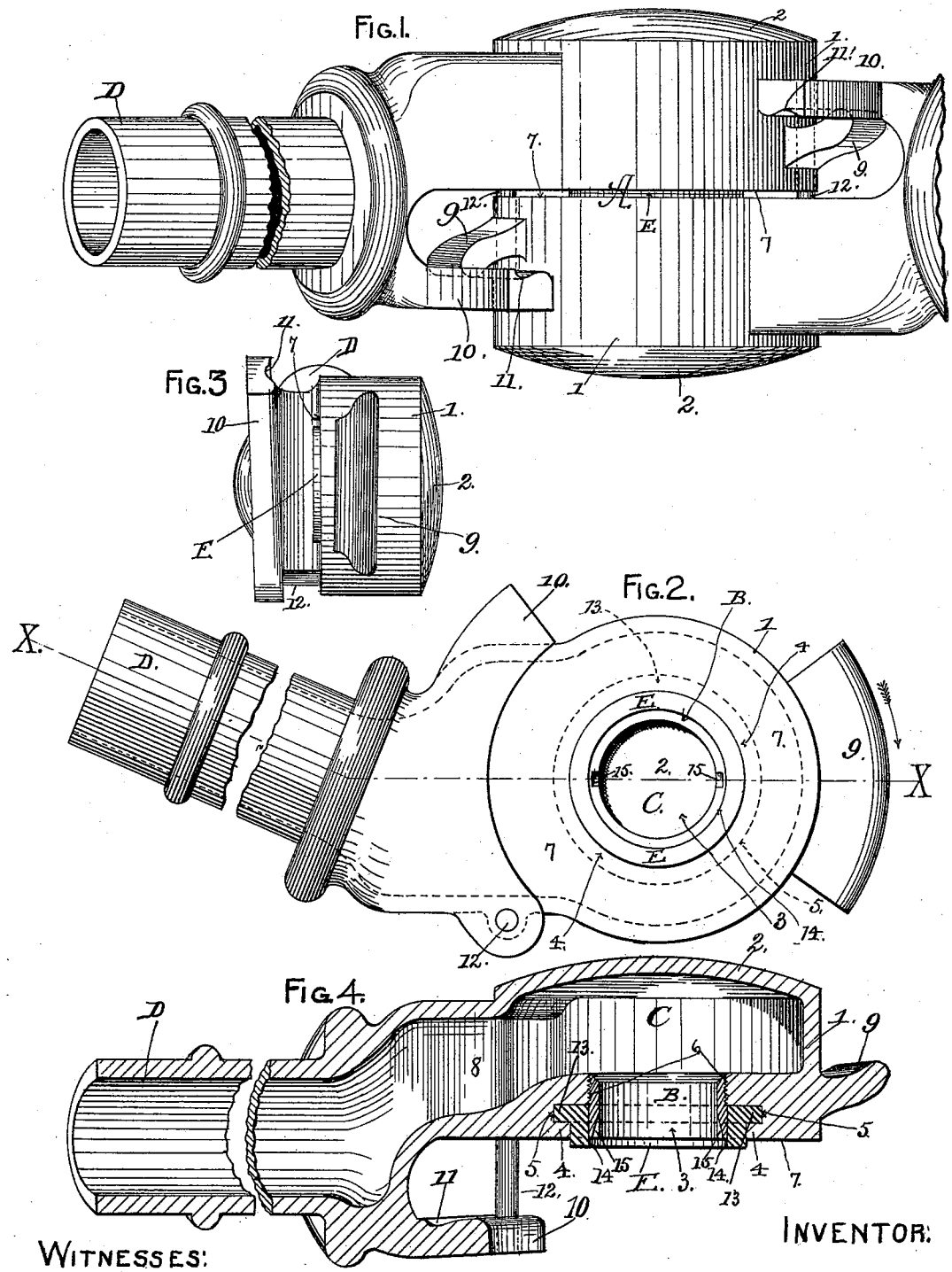

JAMES E. MARBLE, OF ALBANY, NEW YORK, ASSIGNOR, BY MESNE ASSIGNMENTS, OF ONE-HALF TO JOSEPH WILTSIE FULLER.

AIR-BRAKE COUPLING.

SPECIFICATION forming part of Letters Patent No. 484,034, dated October 11, 1892.

Application filed July 13, 1891. Serial No. 399,330. (No model.)

*To all whom it may concern:*

Be it known that I, JAMES E. MARBLE, a citizen of the United States, formerly a resident of Watertown, in the State of New York, but now residing at Albany, in the county of Albany and State of New York, have invented new and useful Improvements in Air-Brake Couplings, of which the following is a full and exact description, reference being had to the accompanying drawings, which form a part of this specification, and in which—

Figure 1 is a side elevation of a coupling which embodies my invention, the two parts of said coupling being connected together as in use. Fig. 2 is a plan view of one of the two corresponding parts of my coupling. Fig. 3 is an end elevation, on a reduced scale, of Fig. 2; and Fig. 4 is a longitudinal section of Fig. 2 at the line X X.

My invention relates to improvements in couplings for connecting together the flexible hose used upon railway-cars for conveying compressed air from the air-compressing mechanism and distributing the same to the air-brake mechanisms of the train, said couplings being automatically separable when the cars to which they are attached become detached by accident; and it consists of the novel construction and combination of parts hereinafter fully described, and pointed out in the claim.

As represented in the drawings, A designates my coupling, which consists of two like parts made of any suitable metal, said parts being exact duplicates of each other. A description of one will suffice for both. Each of said parts consists of a hollow head 1, made in cylindrical form with its outer end closed, as at 2, the opposite end being partially closed, so as to form a central circular opening 3 therein. The outer end of said opening is provided with an inturned annular flange 4, whereby an annular groove 5 is formed in said opening, for a purpose hereinafter explained. The inner end of said opening, which is of a smaller diameter than the outer end, is provided with a screw-thread 6, into which a sleeve B is fitted to screw. The head 1 is provided with a chamber C, from which the opening 3 leads through a plane face 7 of said head. Leading laterally from the chamber C there is a passage 8, which terminates in a tubular stem D, which affords the required facilities for attaching thereto a flexible hose which is commonly used for couplings of a similar character. The center line of said tubular stem practically ranges in line with the plane of the face 7, as shown in Fig. 4, so that when the two parts are coupled together, as shown in Fig. 1, the stems D will range on the same plane, or nearly so. On the periphery of the head 1, diametrically opposite to the passage 8, a segmental flange 9 is formed with a curved shape, whose concave side is turned away from the face 7, and preferably said flange is arranged to incline slightly in the direction of its length. The head 1 is also provided with a second flange 10, diametrically opposite to the flange 9 and arranged to overlap the face 7. A groove 11 is formed in the inner face of the flange 11 to receive the edge of the flange 9 of a corresponding part of a coupling. The flanges 9 and 10 are so arranged that when two heads 1 are placed together in such manner that their faces 7 are parallel with each other and in closely-adjacent positions the flange 9 of one head will enter the groove 11 of the conjoining head. Then by giving said heads or either of them a partial revolution the faces 7 of said heads will be drawn toward each other. To prevent said rotative movement from being carried too far or to a point where the flanges 9 and 10 will be freed from each other, a stop 12 is arranged on each head to engage with the foremost end of the flange 9 of a conjoining coupler.

E designates a compressible gasket, which is fitted to engage in the outer end of the central opening 3 in the head 1. Said gasket is provided with a circumferential flange 13, that is fitted to enter into the groove 5 in said opening, and thereby effect the retention of said gasket in its required place. The gasket E is preferably made of rubber or other flexible and compressible material that will allow said gasket to be bent and twisted into a form that will facilitate its insertion into the opening 3, so that the flange 13 will be carried into the groove 5 by the resilient action of the material of which the gasket is composed. After said gasket is fixed in place the sleeve B is screwed into the opening 3, and by passing through a central opening 14 of said gasket holds the latter securely in place. Said sleeve also forms a shield for the purpose of protecting the gasket E from any destructive action of greasy matter that is liable to be conveyed from air-compressing mechanism into the coupling. The outer end of the sleeve B is preferably arranged on the same plane as the face 7, whereby an annular rim of the gasket E will be left projecting beyond the plane of said face and the end of the sleeve B, and the outer end of the latter is preferably provided with notches 15 or other suitable provision for receiving a tool or driver, whereby said sleeve can be screwed into or out of the opening 3.

The operation of connecting two parts of my coupling together is as follows: The projecting rims of the gaskets E of the two parts are placed face to face in contact with each other, so as to bring the flange 9 of each head 1 into position where it can enter the groove 11 of the other head. Then by giving one or both of said heads a partial rotation in the direction indicated by the arrow on Fig. 2 the flanges 9 and 10 are carried into position to effect a compression of projecting rims of the gaskets E, so as to form an air-tight joint between the two gaskets. When this condition has been attained, the stop 12 of each of the heads 1 will be in contact with the foremost end of the flange 9 of the conjoining head.

On the occurrence of an accidental separation of the cars of a train provided with my couplings the two parts of the coupling will become automatically separated by reason of the strain applied thereto, and in effecting said separation the flanges 9 will be drawn out of the grooves 11 in a longitudinal direction in respect to said coupling, the gaskets E yielding to the compressive force thereby applied, so as to allow the flanges to slip out from said grooves without injury to the parts of the coupling or to the hose which is attached thereto.

I am aware that air-brake couplings composed of two like parts and provided with means for connecting said parts together, so as to form air-tight joints between the contacting faces of said parts, have heretofore been made, and therefore I do not broadly claim such constructions; but What I do claim as my invention, and desire to secure by Letters Patent, is—

An air-brake coupling composed of two like parts of the form herein described, each of said parts consisting of a chambered head having a screw-threaded mouth or opening, a circumferential groove formed therein, an annular gasket made of elastic material and provided with a peripheral flange which is fitted to engage in said circumferential groove, said gasket having a right cylindrical inner surface and projecting beyond the mouth of the coupling, and a right cylindrical tubular metallic sleeve having its inner end screw-threaded and adapted to be screwed into said opening and form a lateral support for said gasket, substantially as described.

In testimony that I claim the foregoing as my own I have hereunto affixed my signature in presence of two witnesses.

JAMES E. MARBLE.

Witnesses:
ARTHUR B. SEIBOLD,
BENNETT S. JONES.